United States Patent [19]

Tokunaga et al.

[11] Patent Number: 5,250,644
[45] Date of Patent: Oct. 5, 1993

[54] CROSSLINKABLE ACRYLIC RUBBER AND METHOD FOR PRODUCING THE SAME

[75] Inventors: Terumitsu Tokunaga, Toyonaka; Katunori Tanaka; Michinori Kuraya, both of Nara, all of Japan

[73] Assignee: Toyo Seal Kogyo Kabushiki Kaisha, Nara, Japan

[21] Appl. No.: 738,019

[22] Filed: Jul. 30, 1991

[30] Foreign Application Priority Data

Aug. 3, 1990 [JP] Japan ................. 2-207197

[51] Int. Cl.$^5$ ................. C08F 222/16; C08F 220/10
[52] U.S. Cl. ................. 526/318; 526/328.5
[58] Field of Search ......................... 526/318

[56] References Cited

U.S. PATENT DOCUMENTS

| | | | |
|---|---|---|---|
| 2,939,855 | 6/1960 | Bartl et al. | 526/318 |
| 3,987,000 | 10/1976 | Glechenhager et al. | 260/31.2 R |
| 4,056,497 | 11/1977 | Reinecke et al. | 260/29.6 TA |
| 4,097,551 | 6/1978 | DiGuilio et al. | 525/301 |
| 4,307,007 | 12/1981 | Brodoway | 260/30.6 R |

FOREIGN PATENT DOCUMENTS

| | | |
|---|---|---|
| 0113904 | 7/1984 | European Pat. Off. |
| 59-272988 | 9/1984 | Japan |
| 61-002713 | 1/1986 | Japan |
| 64-236987 | of 1989 | Japan |

Primary Examiner—Joseph L. Schofer
Assistant Examiner—Wu C. Cheng
Attorney, Agent, or Firm—Varndell Legal Group

[57] ABSTRACT

A crosslinkable acrylic rubber having good alkali resistance and oil resistance as well as other properties required generally for acrylic rubber, which is prepared by copolymerization of an alkyl acrylate and 0.2 to 15 parts by weight, per 100 parts by weight of the alkyl acrylate, of a partial ester of an unsaturated polycarboxylic acid having n carboxyl groups wherein n is an integer of not less than 2 and n-1 carboxyl groups are esterified.

7 Claims, No Drawings

1

CROSSLINKABLE ACRYLIC RUBBER AND METHOD FOR PRODUCING THE SAME

BACKGROUND OF THE INVENTION

The present invention relates to a crosslinkable acrylic rubber and a method for producing the same. More particularly, the invention relates to a crosslinkable acrylic rubber which can provide a crosslinked product having excellent alkali resistance and oil resistance, and a method for producing the same.

It is known that acrylic rubbers are superior in heat resistance and oil resistance to general rubbers. Sulfur vulcanization is not applicable to the acrylic rubbers because they have no unsaturated double bond. Therefore, in order to make crosslinkable, acrylic rubbers have been produced by copolymerizing alkyl acrylates with comonomers to impart a crosslinkability. For example, acrylic acid esters are copolymerized with halogen-containing monomers such as 2-chloroethyl vinyl ether and vinyl chloroacetate, or epoxy monomers such as allyl glycidyl ether, glycidyl acrylate and glycidyl methacrylate so that the obtained acrylic rubbers can be crosslinked with a crosslinking agent or curing agent, e.g. a fatty acid soap or an amine compound such as ethyltetramine or tetraethylpentamine, as disclosed in Japanese Patent Publication Kokoku No. 57843/1986.

However, these known acrylic rubbers have some defects. The acrylic rubbers prepared by copolymerization with the halogen-containing monomers have the defects that the water resistance is poor due to a reactivity of halogen with water, and that they cause prevulcanization of mixed compound because the monomer units introduced for crosslinking react with a crosslinking agent too fast. The acrylic rubbers prepared by copolymerization with the epoxy-containing monomers have no particularly serious defects, but still have problems that they are inferior in heat resistance to the halogen-containing acrylic rubbers and also are insufficient in water resistance and oil resistance and, therefore, they are not satisfactorily applied to uses which require particularly superior properties.

In recent years, the uses of acrylic rubbers are increasing, and it has been demanded to have an alkali resistance. However, the halogen-containing acrylic rubbers are poor in alkali resistance because a halogen has a reactivity with an alkali. Also, the epoxy-containing acrylic rubbers are insufficient in alkali resistance and cannot meet the demand in this respect, too, in addition to poor heat and oil resistances as mentioned above.

An acrylic rubber prepared by copolymerizing methyl acrylate as a main component with ethylene and a monomer having carboxyl group, is lately put on the market as acrylic rubber having an alkali resistance. This acrylic rubber has a good alkali resistance. However, it is poor in oil resistance, especially in grease resistance, because ethylene is used as a comonomer. Therefore, this acrylic rubber is not suitable for uses which require a grease resistance. Because a monomer having a free carboxyl group is introduced as monomer units to impart a crosslinkability, this acrylic rubber has also the problem that the crosslinking reaction proceeds so fast that the prevulcanization of a mixed compound is easy to occur during roll processing or storing of the mixed compound, thus it is not satisfied in processability.

As mentioned above, conventional acrylic rubbers have any defect in properties such that they are poor in water resistance and alkali resistance, or are unsatisfactory in oil resistance, or they are easy to cause prevulcanization of a mixed compound during roll processing or storing because of a high crosslinking reactivity. No acrylic rubber having both a good alkali resistance and a good oil resistance has been provided.

Accordingly, it is an object of the present invention to provide a crosslinkable acrylic rubber capable of providing a cured rubber having excellent alkali resistance and oil resistance in addition to other properties such as processability, water resistance and heat resistance.

A further object of the present invention is to provide a method for producing a crosslinkable acrylic rubber which has a good processability and can provide a cured rubber having good properties such as alkali resistance, oil resistance, water resistance, heat resistance, weather resistance and ozone resistance.

These and other objects of the present invention will become apparent from the description hereinafter.

SUMMARY OF THE INVENTION

In accordance with the present invention, there is provided an elastomeric acrylic copolymer consisting essentially of an acrylic acid ester and 0.2 to 15% by weight, based on said acrylic acid ester, of a partial ester of an unsaturated polycarboxylic acid having n carboxyl groups wherein n is an integer of not less than 2 and $n-1$ carboxyl groups are esterified with an alkyl alcohol havign 1 to 4 carbon atoms.

In another aspect of the present invention, there is provided a method for producing a crosslinkable acrylic rubber which comprises copolymerizing an acrylic acid ester with 0.2 to 15 parts by weight, per 100 parts by weight of said acrylic acid ester, of a partial ester of an unsaturated polycarboxylic acid having a polymerizable unsaturated carbon-carbon double bond and n carboxyl groups wherein n is an integer of not less than 2 and $n-1$ carboxyl groups are esterified.

The acrylic rubber according to the present invention is crosslinkable and can provide a crosslinked product having both excellent alkali resistance and oil resistance.

In the present invention, the partially esterified unsaturated polycarboxylic acid is used as a comonomer in order to impart a crosslinkability to the produced acrylic rubber. Highly reactive $n-1$ carboxyl group or groups of n carboxyl groups in the comonomer are masked by the esterification, and when the acrylic rubber is crosslinked, the free carboxyl groups in the acrylic rubber are consumed by the crosslinking. Accordingly, the cured rubber has no free carboxyl group, or has only a little carboxyl group having a low reactivity even if remains, so the cured rubber reacts hardly with an alkali and does not suffer damage even if the rubber contacts the alkali.

Further, the acrylic rubber according to the present invention has an adequate crosslinking reactivity. The rate of the crosslinking reaction is not too fast and accordingly the acrylic rubber does not cause prevulcanization during roll-mixing or storing of the mixed compound, because there is used as the comonomer the partially esterified unsaturated polycarboxylic acid wherein the carboxy group or groups having a higher reactivity of the whole carboxyl groups which provide crosslinking points, are masked by esterification to remain only carboxyl group having a moderate reactivity as free acid.

Also, the acrylic rubber according to the present invention has no defect of decreasing oil resistance resulting from the use of ethylene as encountered in a conventional acrylic rubber.

DETAILED DESCRIPTION

A partial ester of an unsaturated polycarboxylic acid having a polymerizable carbon-carbon double bond and n carboxyl groups wherein n is an integer of 2 or more and n−1 carboxyl groups are esterified, is used as a conomomer to impart a crosslinkability to the produced acrylic rubber. A partial ester of an $\alpha,\beta$-unsaturated polycarboxylic acid with an alkyl alcohol having 1 to 4 carbon atoms is preferred. Representative examples of the partially esterified unsaturated polycarboxylic acid are, for instance, an unsaturated dicarboxylic acid monoester, e.g. an itaconic acid monoester such as monomethyl itaconate, monoethyl itaconate, monopropyl itaconate or monobutyl itaconate, or a fumaric acid monoester such as monomethyl fumarate, monoethyl fumarate, monopropyl fumarate or monobutyl fumarate; an unsaturated tricarboxylic acid ester, e.g. an aconitic acid diester such as dimethyl aconitate, diethyl aconitate or methylethyl aconitate; and the like. Itaconic acid monoesters such as monomethyl itaconate and monoethyl itaconate are particularly preferred. The partially esterified polycarboxylic acids may be used alone or in admixture thereof.

Any of acrylic acid esters which have been usually used in the preparation of acrylic rubbers can be used in the present invention. Representative examples of the acrylic acid esters are, for instance, an alkyl acrylate such as methyl acrylate, ethyl acrylate, butyl acrylate or 2-ethylhexyl acrylate, an alkoxyalkyl acrylate such as methoxyethyl acrylate, and the like. Alkyl acrylates having a $C_1$ to $C_8$ alkyl group and alkoxyalkyl acrylates having a $C_2$ to $C_8$ alkoxyalkyl group wherein the alkoxy group has 1 to 4 carbon atoms are generally used. These acrylic acid esters may be used alone or in admixture thereof.

When two or more kinds of the acrylic acid esters are used in admixture, they are suitably selected in accordance with the desired properties of the acrylic rubber to be produced. It is preferable to use a mixture of 10 to 50% by weight of methyl acrylate, 30 to 85% by weight of ethyl acrylate and 5 to 30% by weight of methoxyethyl acrylate, because an acrylic rubber with well-balanced oil resistance and low temperature resistance is obtained. The use of methyl acrylate is effective to impart a good oil resistance to the produced acrylic rubber, but adversely affects the resistance to low temperature. Ethyl acrylate provides an acrylic rubber having a relatively good resistance to low temperature, but decreases the oil resistance. Methoxyethyl acrylate provides an acrylic rubber having an excellent resistance to low temperature, but has a tendency to decrease other characteristics. When methyl acrylate, ethyl acrylate and methoxyethy acrylate are used in the proportions mentioned above so that a good oil resistance of methyl acrylate is not impaired and moreover a poor low temperature resistance thereof does not appear, there is obtained an acrylic rubber with well-balanced oil resistance and low temperature resistance.

The partially esterified unsaturated polycarboxylic acid comonomer is used in an amount of 0.2 to 15 parts by weight, preferably 1 to 3 parts by weight, per 100 parts by weight of the acrylic acid ester. When the amount of the comonomer is less than 0.2 part by weight, the crosslinking activity of the produced acrylic rubber is so low that the crosslinking thereof does not proceed sufficiently, because the crosslinking points are slight. When the amount of the comonomer is more than 15 parts by weight, the crosslinking reaction proceeds promptly, so the cured rubber has a high tensile strength, but the hardness increases and consequently the elongation and flexibility are decreased.

The polymerization of a monomer mixture of the acrylic acid ester and the comonomer can be carried out in a known manner such as suspension polymerization or emulsion polymerization. The temperature of polymerization is usually from 50° to 90° C. The time of polymerization is usually from 60 to 180 minutes.

In the polymerization, acrylonitrile may be used. The amount of acrylonitrile is usually at most 20 parts by weight per 100 parts by weight of the acrylate monomer.

The acrylic rubber according to the present invention can be cured by a curing agent or crosslinking agent, e.g. an amine compound such as hexamethylenediamine carbamate, N,N'-dicinnamylidene-1,6-hexanediamine or 4,4'-methylene-bis(cyclohexylamine) carbamate.

Because the partially esterified unsaturated polycarboxylic acid has an appropriate crosslinking reactivity, the acrylic rubber of the present invention has a good processability and can be compounded and stored without causing prevulcanization of mixed compound during roll processing and storage. The crosslinked product of the acrylic rubber has excellent alkali resistance and oil resistance, in addition to other properties, which are required for acrylic rubber, such as heat resistance, water resistance, weatherability and ozone resistance.

The acrylic rubber of the present invention can be suitably employed in molding into seal, gasket, O-ring or roll.

The present invention is more specifically described and explained by means of the following Example, in which all parts are by weight unless otherwise noted. It is to be understood that the present invention is not limited to the Examples.

EXAMPLE 1

To 150 parts of water was added 1.2 parts of monomethyl itaconate, and after elevating the temperature to 85° C., thereto were added 0.1 part of benzoyl peroxide (polymerization initiator) and 5 parts of ethyl acrylate to start suspension polymerization. In a nitrogen stream, 95 parts of ethyl acrylate was intermittently added to the reaction system over 120 minutes and the polymerization was further continued for 60 minutes.

To 100 parts of the produced acrylic rubber were added 50 parts of MAF carbon (commercially available under the trade mark "Seast" #116 from Tokai Denkyoku Kabushiki Kaisha), 1.5 parts of stearic acid, 1.5 parts of paraffin wax, 2 parts of a substituted diphenylamine and 1 part of hexamethylenediamine carbamate. The mixture was kneaded sufficiently in an open roll. It was then press-cured at 170° C. for 15 minutes to produce a rubber sheet, and subjected to postcure at 150° C. for 8 hours. The acrylic rubber did not cause prevulcanization during the kneading in the open roll.

The physical properties of the thus cured acrylic rubber under the ordinary state were measured according to JIS K 6301. The results are shown in Table 1.

The tests of air-oven aging and oil resistance of the cured acrylic rubber were also made at 150° C. for 70 hours according to JIS K 6301. The results are shown in Table 1 with the results of the measurement of alkali resistance, water resistance and compression set.

EXAMPLE 2

The procedure of Example 1 was repeated except that 1.2 parts of monoethyl fumarate was employed instead of monomethyl itaconate.

The cured acrylic rubber was estimated in the same manner as in Example 1. The results are shown in Table 1.

The acrylic rubber did not cause prevulcanization of a mixed rubber compound during the mixing in the open roll.

EXAMPLE 3

The procedure of Example 1 was repeated except that a mixture of 30 parts of methyl acrylate, 60 parts of ethyl acrylate and 10 parts of methoxyethyl acrylate were employed as the acrylate monomer instead of ethyl acrylate.

The obtained acrylic rubber could be kneaded by the open roll without causing the prevulcanization.

The results are shown in Table 1.

EXAMPLE 4

The procedure of Example 1 was repeated except that 1.7 parts of monoethyl itaconate was used instead of monomethyl itaconate.

The obtained acrylic rubber could be kneaded by the open roll without causing the prevulcanization.

The results are shown in Table 1.

COMPARATIVE EXAMPLE 1

A halogen-containing acrylic rubber (commercially available under the trade mark "Nipol AR-71" from Nippon Zeon Co., Ltd.) was kneaded with the additives and cured in the same manner as in Example 1 except that a fatty acid soap-sulfur system was used as the curing agent.

The results are shown in Table 1.

Because of a high crosslinking reactivity of the acrylic rubber, it was necessary to knead carefully little by little in order to conduct the cooling sufficiently from the inside of the roll, thereby avoiding prevulcanization of kneaded rubber.

COMPARATIVE EXAMPLE 2

An acrylic rubber composed of methyl acrylate as a main component, ethylene and a carboxyl group-containing monomer (commercially available under the trade mark "Vamac G" from E. I. Du Pont de Nemours and Company) was kneaded with the additives and cured in the same manner as in Example 1.

The results are shown in Table 1.

Because of a high crosslinking reactivity of the acrylic rubber, it was necessary to knead carefully little by little in order to conduct the cooling sufficiently from the inside of the roll, thereby avoiding prevulcanization of kneaded rubber.

TABLE 1

| Test name and conditions | Test item | Ex. 1 | Ex. 2 | Ex. 3 | Ex. 4 | Com. Ex. 1 | Com. Ex. 2 |
|---|---|---|---|---|---|---|---|
| Physical properties | Hardness (JIS-Hs) | 69 | 67 | 70 | 74 | 70 | 73 |
| under ordinary state | Tensile strength (kg/cm$^2$) | 136 | 110 | 160 | 110 | 123 | 177 |
| | Elongation (%) | 200 | 190 | 230 | 260 | 180 | 330 |
| Air-oven aging | Hardness (JIS-Hs) | 72 | 75 | 72 | 73 | 73 | 76 |
| 150° C. × 70 hours | Tensile strength (kg/cm$^2$) | 136 | 104 | 158 | 102 | 135 | 172 |
| | Elongation (%) | 230 | 200 | 270 | 290 | 150 | 340 |
| Oil resistance | Hardness (JIS-Hs) | 69 | 67 | 71 | 72 | 70 | 71 |
| Dipping in JIS-No. 1 oil | Tensile strength (kg/cm$^2$) | 133 | 106 | 173 | 107 | 133 | 193 |
| 150° C. × 70 hours | Elongation (%) | 200 | 190 | 230 | 280 | 180 | 310 |
| | Changing rate in volume (%) | −0.6 | −0.5 | −2.0 | −0.6 | −2.8 | +5.1 |
| Oil resistance | Hardness (JIS-Hs) | 64 | 63 | 67 | 64 | 65 | 55 |
| Dipping in JIS-No. 3 oil | Tensile strength (kg/cm$^2$) | 119 | 96 | 139 | 95 | 106 | 123 |
| 150° C. × 70 hours | Elongation (%) | 200 | 190 | 240 | 250 | 130 | 210 |
| | Changing rate in volume (%) | +13.5 | +14.0 | +3.0 | +13.9 | +12.9 | +68.6 |
| Water resistance | Hardness (JIS-Hs) | 67 | 66 | 68 | 68 | 63 | 73 |
| 100° C. × 70 hours | Tensile strength (kg/cm$^2$) | 137 | 108 | 155 | 102 | 107 | 178 |
| | Elongation (%) | 190 | 180 | 210 | 230 | 160 | 340 |
| | Changing rate in volume (%) | +3.8 | +4.5 | +4.9 | +7.2 | +16.2 | +4.0 |
| Alkali resistance Dipping in 3% NaOH a+. soln. 80° C. × 20 hours | Changing rate in weight (%) | −0.1 | −1.0 | +0.8 | +1.4 | −3.2 | +1.7 |
| Compression set, 150° C. | 20 hours (%) | 26.1 | 35.5 | 33.2 | 37.4 | 22.4 | 40.3 |
| | 70 hours (%) | 29.7 | 38.8 | 37.9 | 40.7 | 33.8 | 75.1 |
| | 168 hours (%) | 30.4 | 41.9 | 41.9 | 44.3 | 46.3 | 77.7 |

It is observed in Table 1 that the acrylic rubbers of Example 1 to 3 according to the present invention have a good alkali resistance and a good oil resistance, because the changing rate of volume in the alkali resistance test is smaller than that of the commercial halogen-containing acrylic rubber of Comparative Example 1, and because the changing rate of weight and deterioration of physical properties in the oil resistance tests are small.

In contrast, the commercial halogen-containing acrylic rubber of Comparative Example 1 indicates that it is not suitable for uses which require an alkali resistance because of large changing rate of weight in the alkali resistance test. It is also poor in water resistance.

The commercial acrylic rubber of Comparative Example 2 is superior in alkali resistance, but the changing rate of volume in the oil resistance tests, especially JIS No. 3 oil dipping test, is large. The test results show that this acrylic rubber is not suitable for uses which require both alkali resistance and oil resistance.

In addition to the ingredients used in the Examples, other ingredients can be used in the Examples as set forth in the specification to obtain substantially the same results.

What we claim is:

1. An elastomeric acrylic copolymer consisting essentially of an acrylic acid ester and 0.2 to 15% by weight, based on said acrylic acid ester, of at least one partial ester of unsaturated polycarboxylic acid selected from the group consisting of an itaconic acid monoester, a fumaric acid monoester and an aconitic acid ester, said partial ester being an ester with an alkyl alcohol having 1 to 4 carbon atoms, wherein said copolymer is prepared in absence of diene rubber.

2. The copolymer of claim 1, wherein said partial ester of unsaturated polycarboxylic acid is at least one member selected from the group consisting of a monoalkyl fumarate and a monoalkyl itaconate.

3. The copolymer of claim 1, wherein said partial ester of unsaturated polycarboxylic acid is an itaconic acid monoester.

4. The copolymer of claim 1, wherein said acrylic acid ester is at least one member selected from the group consisting of alkyl acrylates having a $C_1$ to $C_8$ alkyl group and alkoxyalkyl acrylates having a $C_2$ to $C_8$ alkoxyalkyl group.

5. The copolymer of claim 1, wherein said acrylic acid ester is a mixture of 10 to 50% by weight of methyl acrylate, 30 to 85% by weight of ethyl acrylate and 5 to 30% by weight of methoxyethyl acrylate.

6. The copolymer of claim 1, which is a copolymer of said acrylic acid ester and said partial ester of unsaturated polycarboxylic acid.

7. The copolymer of claim 1, which is a copolymer of said acrylic acid ester, said partial ester of unsaturated polycarboxylic acid and acrylonitrile.

* * * * *